United States Patent
Tanamachi

Patent Number: 5,371,496
Date of Patent: Dec. 6, 1994

[54] TWO-PART SENSOR WITH TRANSFORMER POWER COUPLING AND OPTICAL SIGNAL COUPLING

[75] Inventor: Steven W. Tanamachi, Lauderdale, Minn.

[73] Assignee: Minnesota Mining and Manufacturing Company, St. Paul, Minn.

[21] Appl. No.: 995,946

[22] Filed: Dec. 18, 1992

Related U.S. Application Data

[63] Continuation of Ser. No. 687,170, Apr. 18, 1991, abandoned.

[51] Int. Cl.⁵ .............................................. G08C 19/36
[52] U.S. Cl. ........................... 340/870.28; 340/870.29; 340/870.30; 340/825.72; 359/148; 359/154
[58] Field of Search .............. 340/870.28, 870.29, 340/825.72, 870.3, 870.31; 336/DIG. 2; 372/19; 359/154, 148

[56] References Cited

U.S. PATENT DOCUMENTS

| | | | |
|---|---|---|---|
| 3,522,509 | 8/1970 | Hasenbalg | 336/DIG. 2 |
| 3,961,526 | 6/1976 | Himmelstein | 73/862.339 |
| 4,030,058 | 6/1977 | Riffe et al. | 336/DIG. 2 |
| 4,236,086 | 11/1980 | Hoebel | 336/DIG. 2 |
| 4,491,981 | 1/1985 | Weller et al. | 359/154 |
| 4,531,193 | 7/1985 | Yasuhara et al. | 377/19 |
| 4,887,465 | 12/1989 | Bryne et al. | 340/870.31 |

FOREIGN PATENT DOCUMENTS

| | | |
|---|---|---|
| 0213727 | 3/1987 | European Pat. Off. . |
| 0263233 | 4/1988 | European Pat. Off. . |
| 0368461 | 5/1990 | European Pat. Off. . |

OTHER PUBLICATIONS

NASA Tech Briefs, Sep. 1988, pp. 22, 24, John C. Moody et al., "Contactless Coupling for Power and Data".

Primary Examiner—John K. Peng
Assistant Examiner—Andrew Hill
Attorney, Agent, or Firm—Gary L. Griswold; Walter N. Kirn; William D. Bauer

[57] ABSTRACT

A two-part sensor includes a power source/signal receiver and a signal generator which are physically spaced and disconnected from one another. The power source/signal receiver is encased within transparent encapsulating material and includes an annular solenoid core with an aperture, a coil around the core and a photodiode mounted in the aperture. The photodiode detects a modulated light beam received from the signal generator and produces an output information signal. The solenoid coil produces a fluctuating magnetic field when connected to a power supply. The signal generator is encased within transparent encapsulating material and includes an annular relay coil with an aperture, a coil around the core, a transducer circuit and an LED mounted within the aperture. The relay coil provides a signal generator supply potential when positioned within the magnetic field produced by the power source/signal receiver. The supply potential powers the transducer circuit and the LED. The transducer circuit generates a modulated transducer signal as a function of a sensed parameter. The LED is coupled to the transducer circuit and produces the modulated light beam as a function of the transducer signal.

21 Claims, 6 Drawing Sheets

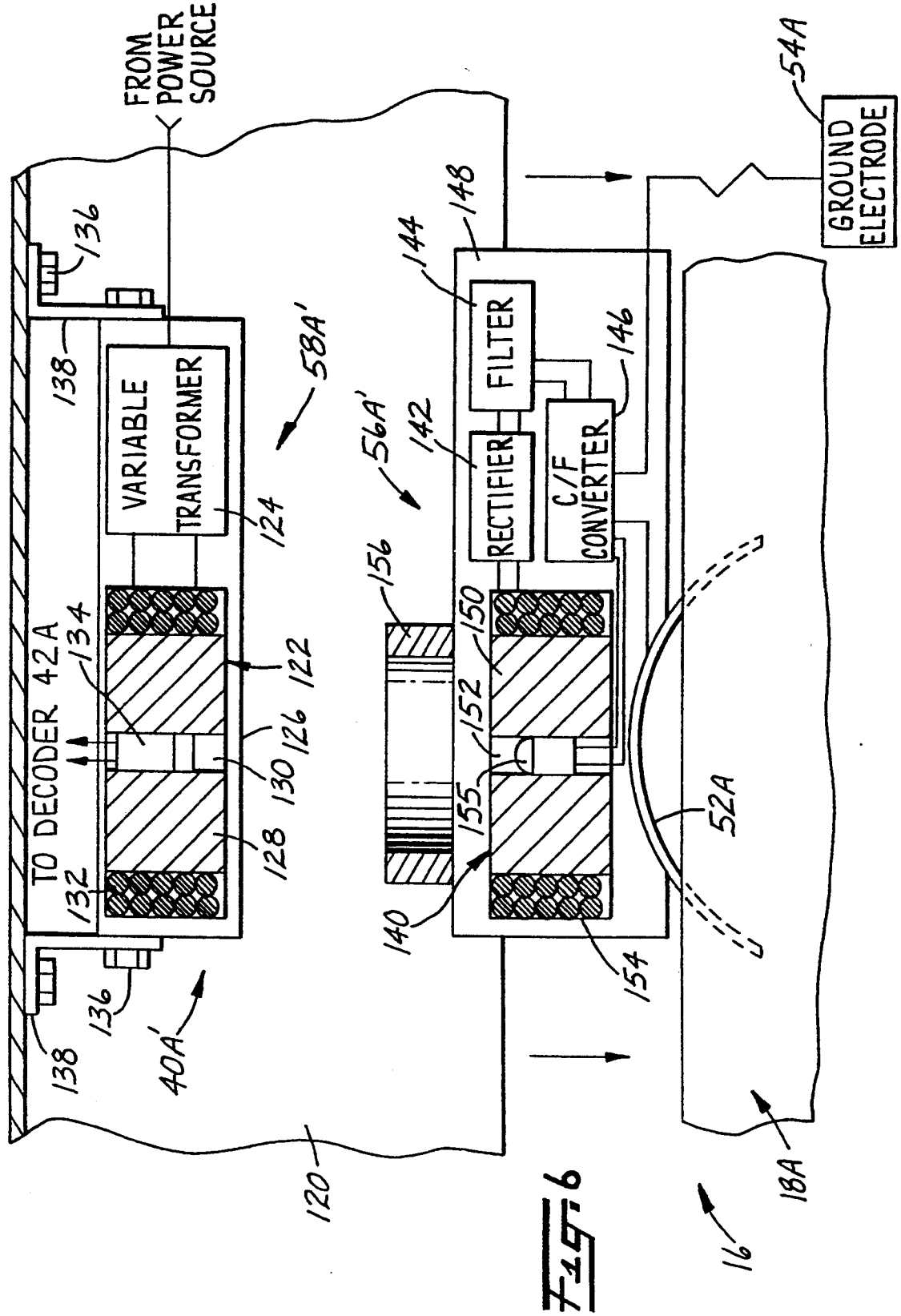

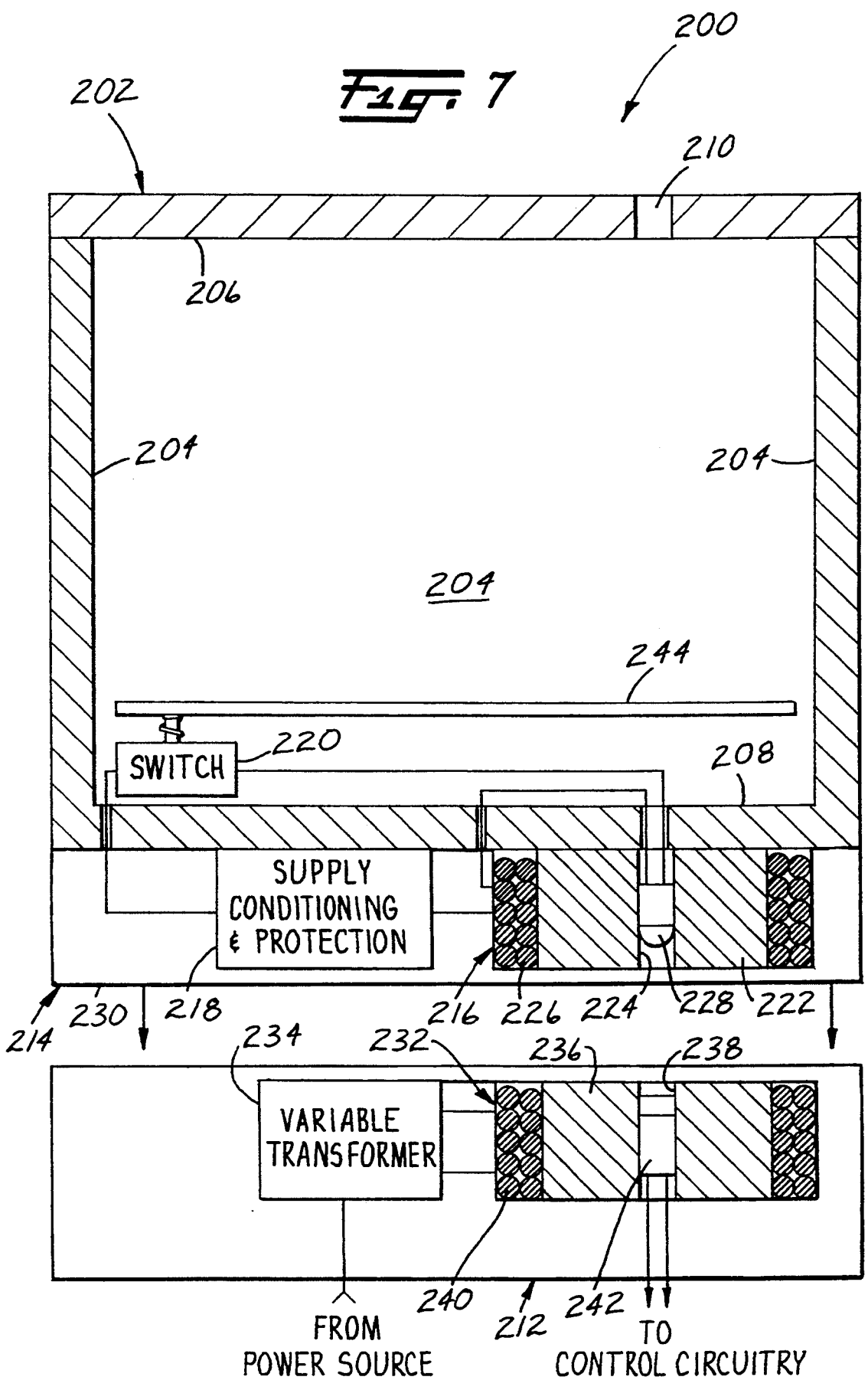

TWO-PART SENSOR WITH TRANSFORMER POWER COUPLING AND OPTICAL SIGNAL COUPLING

This is a continuation of application Ser. No. 07/687,170 filed Apr. 18, 1991, abandoned

REFERENCE TO CO-PENDING APPLICATION

Reference is hereby made to commonly assigned co-pending application Ser. No. 07/687,285 entitled Capacitive Film Position Sensing System For A Film Processor, filed on even date herewith.

BACKGROUND OF THE INVENTION

The present invention relates generally to sensors and transducers. In particular, the present invention is a two-part sensor with electromagnetic power and signal coupling between the two parts.

Sensors, also known as transducers, are commonly used to generate electrical signals representative of monitored parameters. The electrical signals can be used to drive a display and provide a visual indication of the parameter value, or processed and used for machine control operations.

A wide variety of sensors are commercially available. The type of sensor used in a given application will depend upon a variety of factors including the environment in which it is to be used and the specifications to which it must perform. By way of example, sensors used to detect the presence of sheets of photographic film being developed within a processor must be able to withstand the chemicals present within this relatively hostile environment. Exposed metal components, such as those of connectors which couple the electrical signals to display or control circuitry, can be quickly corroded.

There is a continuing need for improved sensors. A sensor suitable for use in a hostile chemical environment would be particularly desirable. Any such sensor must be accurate and reliable. It must also be cost effective to be commercially viable.

SUMMARY OF THE INVENTION

The present invention is a reliable and accurate two-part sensor which includes a power source/signal receiver physically spaced and disconnected from a signal generator. Power and information are electromagnetically coupled between the two parts, thereby enabling the sensor to be used in harsh environments where it is advantageous to separate the sensor from the control circuitry to which it is connected. The power source/signal receiver includes a solenoid coil for producing a fluctuating magnetic field when connected to a power supply, and a radiation sensitive detector. The signal generator includes a relay coil, a transducer circuit and a radiation source. The relay coil is configured to be positioned within the fluctuating field produced by the solenoid coil to provide a signal generator supply potential. The transducer circuit is connected to receive the signal generator supply potential from the relay coil and generates a modulated transducer signal as a function of a sensed parameter. The radiation source is connected to the transducer circuit and powered by the signal generator supply potential. A modulated radiation beam is emitted by the source as a function of the transducer signal. The radiation detector of the power source/signal receiver detects the modulated beam and produces a modulated output signal as a function of the sensed parameter.

In one embodiment the solenoid coil and relay coil include magnetically soft annular cores with apertures, and wire coils wound around the cores. The radiation source is an LED mounted within the aperture of the relay core while the detector is a photodiode mounted within the aperture of the solenoid core. The power source/signal receiver and signal generator unite can be encased within encapsulant material.

In another embodiment the transducer circuit includes a capacitance-to-frequency converter for frequency modulating the radiation beam as a function of a sensed capacitance. Yet another embodiment of the transducer circuit includes a switch for sensing the presence of an object and for on-off modulating the radiation beam as a function of the sensed presence.

BRIEF DESCRIPTION OF THE DRAWINGS

FIG. 6 is a diagrammatic and block diagram representation of a two-part sensor in accordance with the present invention (an alternative embodiment of a sensor shown in FIG. 1), and the manner in which it is mounted to the film processor shown in FIG. 2.

FIG. 7 is a diagrammatic and block diagram representation of an alternative embodiment and application of the present invention.

DETAILED DESCRIPTION OF THE PREFERRED EMBODIMENTS

Figure 1:
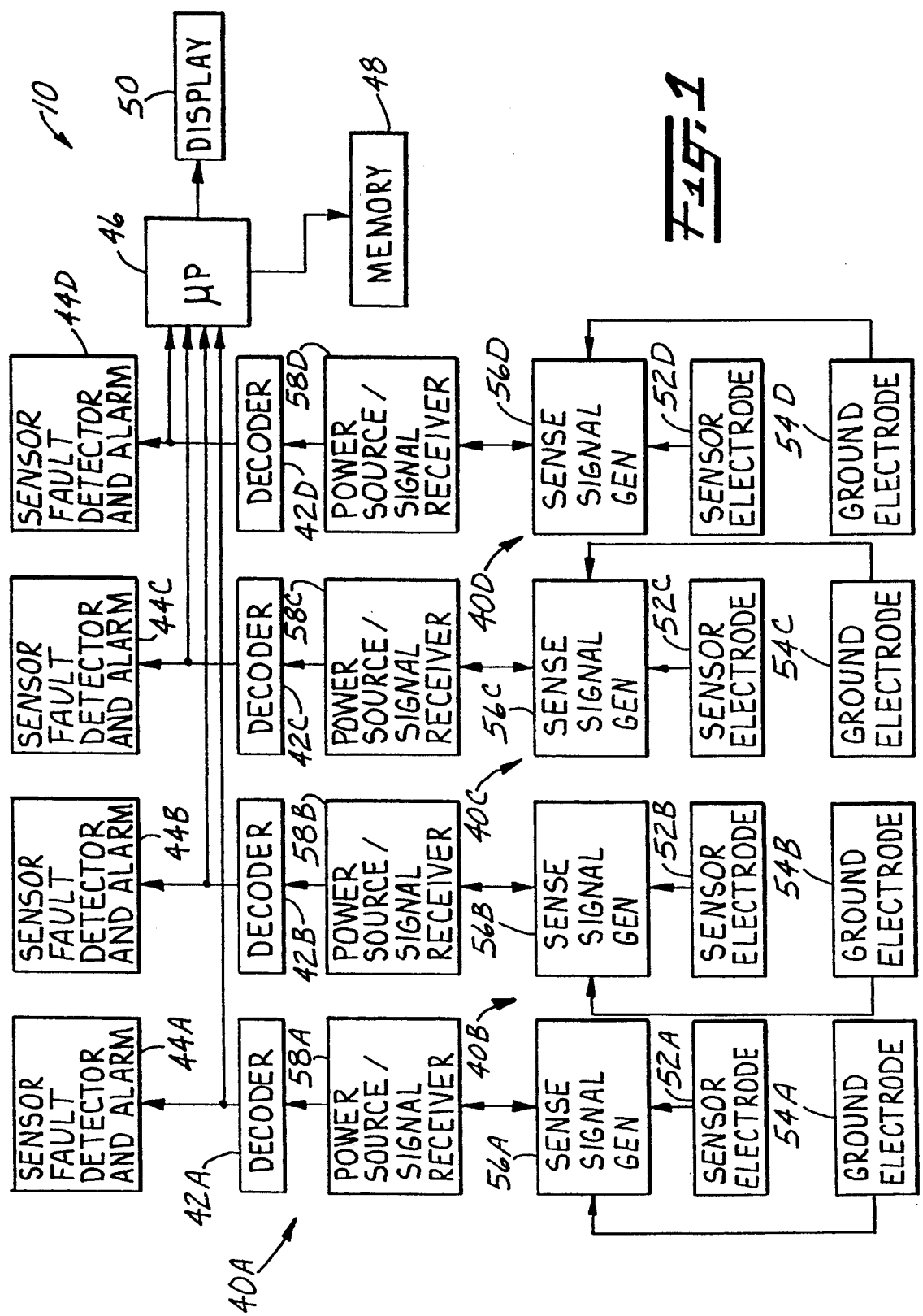
FIG. 1 is a block diagram of a film position sensing system.

A two-part capacitive sensor 40A' in accordance with the present invention is illustrated generally in FIG. 6. Sensor 40A' can be used in a film position sensing system such as that shown in FIG. 1. Film position sensing system 10 is configured to provide information regarding the positions of exposed sheets of media such a photographic film as they are driven through developing chemical baths of a processor such as that shown at 16 in FIG. 2.

Film processor 16 can be of a known or otherwise conventional design, and typically includes a number of adjacent tanks such as 18A–18D which hold the associated liquid chemical developing baths 14A–14D. Film transport mechanisms 20A–20D are removably positioned within tanks 18A–18D and drive sheets of film 12 through baths 14A–14D, respectively. Transport mechanisms 20A–20D include film entrance nips 24A–24D and film exit nips 28A–28D, respectively. Entrance nips 24A–24D are formed by a pair of driven rollers 22A–22D, respectively. Exit nips 28A–28D are formed by a pair of driven rollers 26A–26D, respectively. Other driven and/or undriven rollers 30A–30D between entrance nips 24A–24D and exit nips 28–28D of respective transport mechanism 20A–20D guide sheets of film 12 through baths 14A–14D along transport paths 32A–32D. Sheets of film 12 are guided between exit nip 28A of transport mechanism 20A and entrance nip 24B of transport mechanism 20B by crossover guide 34A. In a similar manner, sheets of film 12 are guided between transport mechanisms 20B and 20C by crossover guide 34B, and between transport mechanisms 20C and 20D by crossover guide 34C. Crossover guide 34D guides sheets of film 12 to subsequent processing stations (not shown) as the film emerges from bath 14D. Crossover guides 34A-34D are downwardly opening arcuate members which bend the sheets of film 12 as they emerge from exit nips 28A-28D, and direct the sheets of film into the following processing stations.

Figure 2:
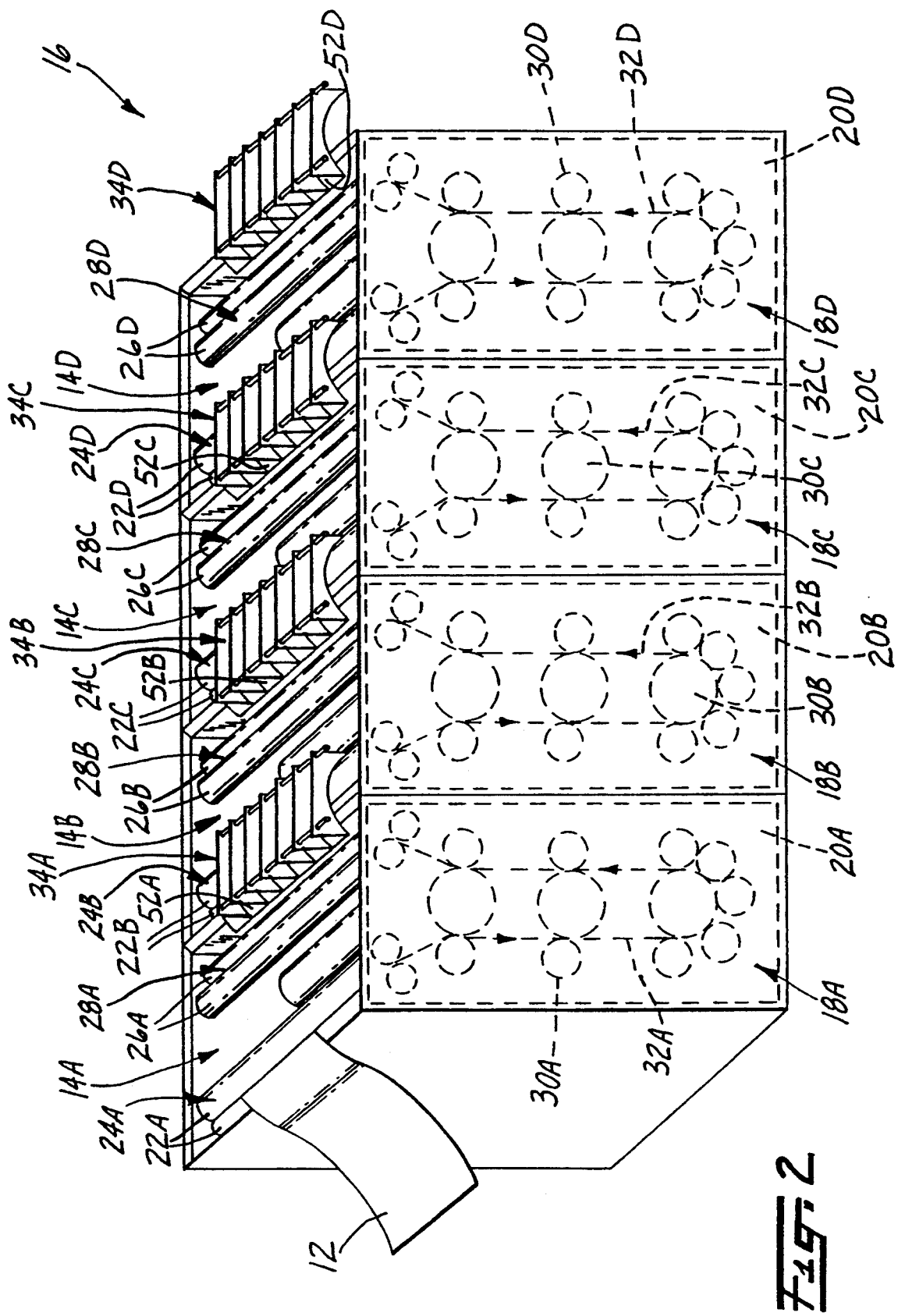
FIG. 2 is an illustration of an automatic film processor with which the position sensing system shown in FIG. 1 can be used.

Film position sensing system 10 includes capacitive sensors 40A-40D (alternative embodiments of sensor 40A' which is described below), decoders 42A-42D, sensor fault detectors and alarms 44A-44D, microprocessor 46, memory 48 and display 50. Sensors 40A-40D include respective sensing electrodes 52A-52D, ground electrodes 54A-54D, sense signal generators 56A-56D and power source/signal receivers 58A-58D. As shown in FIG. 2, sensing electrodes 52A-52D are positioned on the lower, guiding surfaces of crossover guides 34A-34D. Ground electrodes 54A-54D are positioned within respective tanks 18A-18D (not visible in FIG. 2), and provide electrical contact between baths 14A-14D of processing chemicals and sense signal generators 56A-56D. In one embodiment, electrodes 54A-54D are strips of stainless steel immersed approximately five centimeters below the surface of liquid baths 14A-14D.

The liquid processing chemicals within baths 14A-14D are electrically conductive. Given the distance between sensing electrodes 52A-52D and the respective baths 14A-14D of developing chemicals, the capacitance between associated sensing electrodes 52A-52D and ground electrodes 54A-54D is relatively small when sheets of film 12 are not present between the baths and sensing electrodes (i.e., not near the sensing electrodes). However, the capacitance increases to a relatively high value when the distance between ground electrodes 54A-54D and associated sensing electrodes 52A-52D is reduced by the presence of wet sheets of film 12 between the baths and electrodes. In effect, the wet sheets of film 12 become an extension of the ground electrodes 54A-54D.

Electrical power for sense signal generators 56A-56D is provided by power source/signal receivers 58A-58D, respectively. Frequency modulated sensed media signals representative of the capacitance between associated sensing electrodes 52A-52D and baths 14A-14D, and therefore indicative of the presence of sheets of film 12, are generated by sense signal generators 56A-56D and coupled to decoders 42A-42D through power source/signal receivers 58A-58D. Decoders 42A-42D detect the frequency modulated signals and generate digital film detection signals representative of the presence of sheets of film 12 at respective sensing electrodes 52A-52D. Microprocessor 46 is connected to receive the film detection signals from decoders 42A-42D, and processes the signals in accordance with programs stored in memory 48 to determine the positions of the sheets of film within tanks 18A-18D. With this information microprocessor 46 can drive display 50 in such a manner as to provide an operator with information pertaining to the location of jammed and loose film 12. Sensor fault detectors and alarms 44A-44D monitor the operational statue of respective sensors 40A-40D and decoders 42A-42D, and provide the operator with an alarm in the event these portions of film sensing system 10 are malfunctioning.

Figure 3:
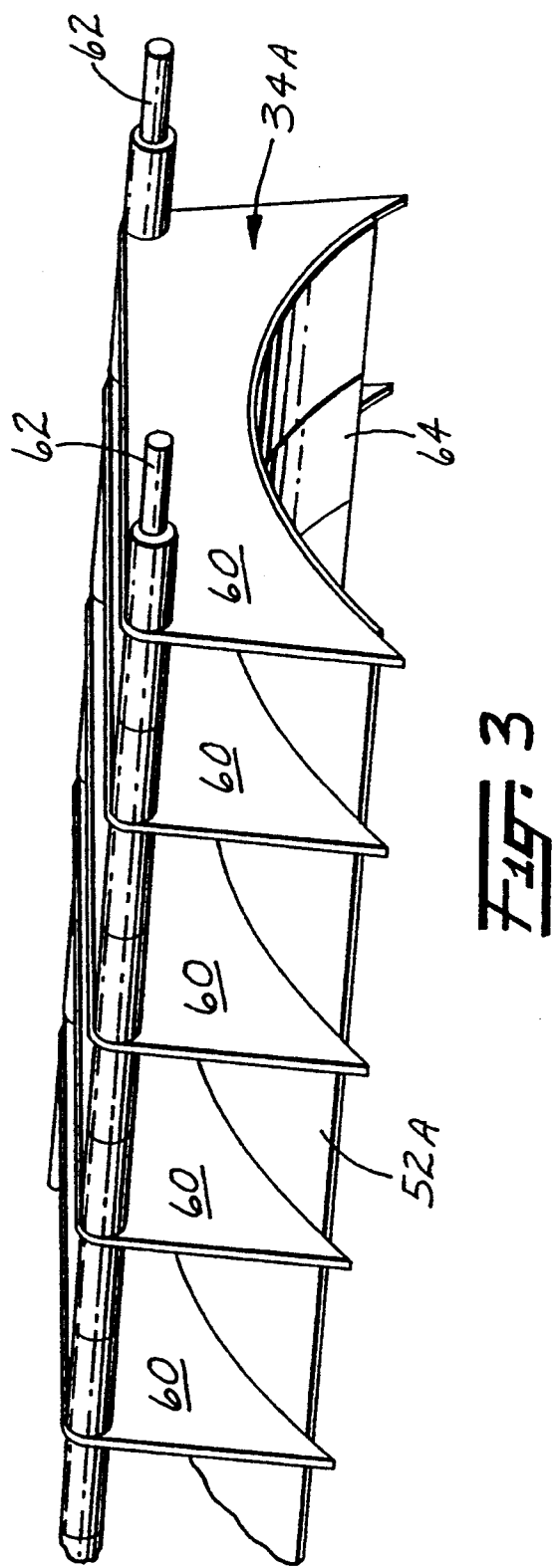
FIG. 3 is a detailed illustration of the crossover guide and sensor electrode shown in FIG. 2.

Crossover guide 34A and sensing electrode 52A can be identical in construction to guides 34B-34D and electrodes 52B-52D, and are described in greater detail with reference to FIG. 3. Crossover guide 34A is formed from a number of plastic guide members 60 which are secured in a parallel, spaced apart arrangement with respect to one another by support rods 62. Sensing electrode 52A is an arcuate stainless steel plate member secured by an adhesive or other fastener (not shown) to the downwardly opening arcuate edges of guide members 60. Sensing electrode 52A is coated with a corrosion and fungus resistant dielectric or insulating material to prevent short circuits with chemical baths 14A-14D through sheets of film 12. Strips of low surface tension tape 64 (only one strip is visible in FIG. 3) can be applied to electrode 52A to create ridges along the path of motion over which the sheets of film 12 are guided. These ridges of tape 64 help prevent wet sheets of film 12 from sticking to electrode 52A. Although this function is not shown, support rode 62 can be used to mount crossover guide 34A and electrode 52A in position over tanks 18A and 18B.

Figures 4, 5:
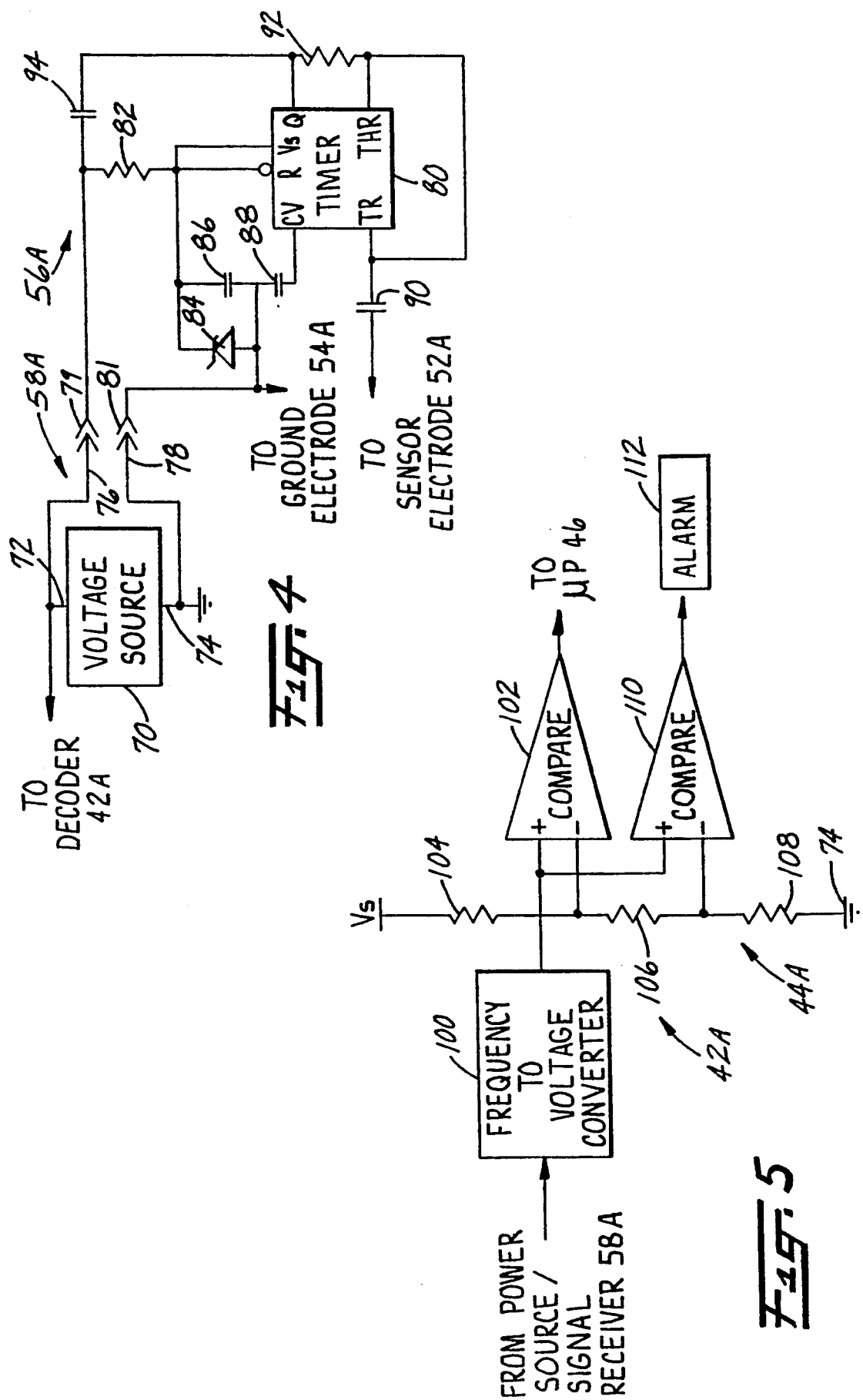
FIG. 4 is a detailed circuit diagram of a sensor shown in FIG. 1.
FIG. 5 is a detailed circuit diagram of a decoder and a sensor fault detector and alarm shown in FIG. 1.

Sense signal generator 56A and power source/signal receiver 58A can be identical to generators 56B-56D and source/receivers 58B-58D, and are illustrated in greater detail in FIG. 4. Power source/signal receiver 58A includes voltage source 70 for generating a supply potential between positive terminal 72 and ground 74. The supply potential generated by voltage source 70 is coupled to signal generator 56A through conductors 76 and 78 and connectors 79 and 81. Conductors 76 and 78 can be the conductors in a shielded single conductor cable.

Sense signal generator 56A is a capacitance-to-frequency (C/F) converter and includes integrated circuit timer 80 configured as an astable multivibrator. In one embodiment, timer 80 is a National Semiconductor LMC555 device. To prevent the need for any more than the two conductors 76 and 78 between signal generator 56A and power source/signal receiver 58A, the signal generator is configured to both receive power from and provide the frequency modulated output signal to the power source/signal receiver over conductors 76 and 78. The positive supply potential received from voltage source 70 over conductor 76 is coupled to the reset terminal R of timer 80 through resistor 82. The parallel combination of Zener diode 84 and capacitor 86 functions as a voltage regulator and is interconnected between ground electrode 54A and both the reset terminal R and supply voltage terminal VS of timer 80. The controlled voltage terminal CV of timer 80 is coupled to ground electrode 54A and conductor 78 of power source/signal receiver 58C through capacitor 88. Sensing electrode 52A is coupled to the trigger terminal TR of timer 80 through series capacitor 90. Capacitor 90 has a capacitance value which is relatively large with respect to the capacitance being measured between the sensor electrode 52A and ground electrode 54A, and is a 0.22 $\mu$f capacitor in one embodiment. The trigger terminal TR is coupled directly to threshold terminal THR. Threshold terminal THR is interconnected to output terminal Q of timer 80 through resistor 92. The timer output terminal Q is coupled to conductor 76 through capacitor 94.

Timer 80 produces an output signal at its terminal Q which is frequency modulated as a function of the sensed capacitance between sensing electrode 52A and ground electrode 54A. Since the capacitance between sensing electrode 52A and ground electrode 54A will vary as a function of the proximity of sheets of film 12 to the sensing electrode, the frequency of the output signal is indicative of the presence of the film. The frequency modulated output signal produced by timer 80 is coupled back to power source/signal receiver 58A over conductor 76 through capacitor 94.

In one embodiment, power source/signal receiver 58A produces an eight volt DC potential. Resistor 82, diode 84 and capacitor 86 are configured to present a regulated 3.6 volt potential to the reset terminal R and voltage supply terminal VS of timer 80. Values of capacitor 90 and resistor 92 are selected in such a manner that the frequencies of the output signals produced by timer 80 vary over a relatively large range with the increased capacitance between sensing electrode 52A and ground electrode 54A. In one embodiment, the output signals vary between a frequency of 20K Hz when sheets of film 12 are not present between sensing electrode 52A and ground electrode 54A, and a frequency of 600 Hz when a wet sheet is present near the sensing electrode. Signal generator 56A can be encased within corrosion resistant potting compound (not shown) and mounted to the upper surface of electrode 52A to prevent reactions from splashed bathe 14A–14C. The output signals have an amplitude of one to two volts and are modulated onto the 8 volt supply generated by voltage source 70.

Decoder 42A and sensor fault detector and alarm 44A are identical to their counterparts 42B–42D and 44B–44D, and are illustrated in greater detail in FIG. 5 Decoder 42A includes frequency-to-voltage converter 100 and comparator 102. Frequency-to-voltage converter 100 is connected to receive the frequency modulated sensor signals from power source/signal receiver 58A, and produces voltage amplitude modulated output signals as a function of the frequencies of the sensor signals. The voltage output signals are applied to the noninverting (+) input terminal of comparator 102. A sensed film reference voltage is applied to the inverting (−) input terminal of comparator 102. The sensed film reference voltage is produced by a voltage divider formed by resistors 104, 106, and 108 interconnected in a series circuit between the supply of potential Vs and ground terminal 74. The sensed film reference voltage is a voltage well below that which will be produced by frequency-to-voltage converter 100 when no film 12 is present between sensing electrode 52A and ground electrode 54A, yet above the voltage level to which the frequency-to-voltage converter output will drop when the film is present between the sensing and ground electrodes. Digital film detection signals will thereby be produced by comparator 102 and coupled to microprocessor 46. As a result of the large dynamic range of the sensed media signals by signal generator 56A, the film detection signals will accurately indicate the detected presence of sheets of film 12.

Sensor fault detector and alarm 44A includes comparator 110 and alarm 112. The non-inverting (+) input terminal of comparator 110 is connected to receive the voltage output signals from frequency-to-voltage converter 100. The inverting (−) input terminal of comparator 110 is connected between voltage divider resistors 106 and 108 to receive a sensor fault reference voltage. The sensor fault reference voltage is a voltage below that which frequency-to-voltage converter 100 would produce in response to the presence of sheets of film 12 near sensing electrode 52A. Sensor fault signals will thereby be produced at the output of comparator 110 when sense signal generator 56A or converter 100 are not functioning properly (e.g., when the signal generator is inoperative and provides no signal to the fault detector and alarm). Alarm 112, which can be a visual or audible alarm, is activated in response to the sensor fault signals to alert the operators of film processor 16.

Film detection signals representative of the sensed presence of sheets of film 12 being transported between tanks 18A and 18B, 18B and 18C, 18C and 18D, and from tank 18D are provided to microprocessor 46 by decoders 42A–42D, respectively. Program data characterizing the length of transport paths 32A–32D, the speed at which film 12 is transported over these transport paths, or other information characterizing the expected time required for the film to travel between any given sensors 40A–40D, is stored in memory 48. By evaluating the presence, absence and sequence of the detection signals received from detectors 42A–42D as a function of the information stored in memory 48, microprocessor 46 can track the locations of sheets of film 12 within processor 16. Microprocessor 46 can thereby isolate the film jams and locations of loose film to specific tanks 18A–18D. This information can be provided to an operator by means of visual display 50. Alternatively, microprocessor 46 can cause display 50 to provide a visual indication of the detected presence of sheets of film 12 at various locations within processor 16.

A sensor 40A' in accordance with the present invention is illustrated in FIG. 6. Sensor 40A' includes power source/signal receiver 58A' and sense signal generator 56A'. Like their counterparts in sensor 40A described above, power source/signal receiver 58A' and sense signal generator 56A' cooperate to produce sensed media signals which are coupled to decoder 42A. However, unlike their counterparts, there are no physical electrical interconnections between power source/signal receiver 58A' and sense signal generator 56A'. Power is coupled to signal generator 56A' by transformer action, and information is optically coupled back to power source/signal receiver 58A'. Sense signal generator 56A' is fixedly mounted to sensor electrode 52A, while power source/signal receiver 58A' is mounted to a cover 120 which removably encloses the top of tanks 18A–18D. Since there are no electrical interconnections, cover 120 and the power source/signal receivers such as 58A' mounted thereto can be easily removed from processor 16 to permit access to tanks 18A–18D and transport mechanisms 20A–20D.

Power source/signal receiver 58A' includes a solenoid unit 122 and AC transformer 124 sealed within chemical resistant potting compound 126. Solenoid 122 includes a circular magnetically soft core 128 with an aperture 130 extending through its center. A coil 132 is wound around the outer edge of core 128, and is electrically connected to AC transformer 124. AC transformer 124 is powered by a conventional 120 VAC source (not shown). Photodiode 134 is mounted within core aperture 130, and is coupled to decoder 42A. Fasteners such as bolts 136 and brackets 138 can be used to mount power source/signal receiver 58A' to the inside of cover 120.

Sense signal generator 56A' includes relay coil assembly 140, rectifier 142, filter 144 and C/F (capacitance-to-frequency) converter 146, all of which are sealed within corrosion resistant potting material 148. Relay coil assembly 140 includes a generally cylindrical magnetically soft core 150 with an aperture 152 extending through its center. A coil 154 is wound around the outer edge of core 150 and is electrically interconnected to rectifier 142. Filter 144 couples rectifier 142 to C/F converter 146. A light emitting diode (LED) 155 is mounted within aperture 152 and electrically coupled to C/F converter 146. C/F converter 146 is also interconnected to sensing electrode 52A and ground electrode 54A. An annular flexible seal 156 is mounted to signal generator 56A' above relay coil assembly 140.

Solenoid assembly 122 of power source/signal receiver 58A' and relay coil assembly 140 of signal generator 56A' are positioned with respect to one another in such a manner that photodiode 134 and LED 155 will be optically aligned when cover 120 is positioned on film processor 16. Potting materials 126 and 148 must be capable of propagating the radiation produced by LED 155 (e.g., be sufficiently transparent). Alternatively, other optical elements (such as lenses, not shown) can be positioned within potting compound 126 and 148 to create an optical path between LED 155 and photodiode 134.

When cover 120 is positioned on film processor 16, power source/signal receiver 58A' will meet and compress seal 156 to prevent splashes from baths 14A–14D from interfering with the optical path between LED 155 and photodiode 134. In response to the AC power provided by transformer 124, coil 132 sets up a fluctuating magnetic field about core 128. The field about core 128 is impinged upon core 150 and causes an alternating current flow through coil 154. The AC current flow from coil 154 is conditioned by rectifier 142 and filter 144 to generate a DC supply potential which is applied to C/F converter 146. C/F converter 146 can be a multivibrator circuit similar to that of signal generator 56A described above, and functions as a transducer circuit to generate frequency modulated signals as a function of the capacitance between sensing electrode 52A and ground electrode 54A. LED 155 is driven by the frequency modulated output signal of C/F converter 146. The frequency modulated light beam generated by LED 155 is optically propagated to photodiode 134. The output of photodiode 134 is a frequency modulated signal which is representative of the capacitance between sensing electrode 52A and ground electrode 54A, and therefore the presence of sensed sheets of film 12. The signal from photodiode 134 is coupled to decoder 42A and can be subsequently processed in a manner identical to that described above.

Sensor 200, a second embodiment of the present invention, is illustrated generally in FIG. 7. Sensor 200 is similar to sensor 40A' described above, but is configured to provide an on-off modulated output signal to the control circuitry of a laser imager (not shown) to indicate the presence or absence of imaged film (also not shown) within a receive magazine 202. Receive magazine 202 is a light-tight enclosure designed to receive, temporarily store and transport imaged but undeveloped sheets of film. In the embodiment shown, magazine 202 includes side walls 204, top wall 206 and bottom wall 208. Film is deposited into magazine 202 through opening 210.

Sensor 200 includes a power source/signal receiver 212 and a sense signal generator 214. Signal generator 214 is positioned on the exterior of receive magazine 202, and is on bottom wall 208 in the embodiment shown. Signal generator 214 includes a relay coil assembly 216, supply conditioning and Protection circuitry 218 and switch 220. Relay coil assembly 216 includes a generally cylindrical and magnetically soft core 222 with an aperture 224 extending through its center. A coil 226 is wound around the outer edge of core 222 and is electrically interconnected to supply conditioning and protection circuitry 218. A light emitting diode or LED 228 is mounted within aperture 224 and is connected to coil 226 and switch 220. Switch 220 is also connected to supply conditioning and protection circuitry 218. Relay coil assembly 216 and circuitry 218 can be sealed within an enclosure 230. In other embodiments a pot core is used for coil assemblies 216 and 232.

Power source/signal receiver 212 includes a solenoid coil assembly 232 and a transformer 234. Solenoid coil assembly 232 includes an annular magnetically soft core 236 with an aperture 238 through its center. A coil 240 is wound around the outer edge of core 236 and is electrically connected to AC transformer 234. Transformer 234 is driven by a 60 KHz AC power source (not shown). A photodiode 242 is mounted within core aperture 238 and is coupled to the laser imager control circuitry.

Power source/signal receiver 212 is located in such a manner that coil assemblies 216 and 232 are adjacent one another and LED 228 and photodiode 242 are optically aligned when receive magazine 202 is properly positioned within the laser imager. In response to the AC power provided by transformer 234, coil 240 sets up a fluctuating magnetic field about core 236. The field about core 236 is impinged upon core 222. If no sheets of film are present within magazine 202, switch 220 will be in its normally open state and inhibit any current flow through coil 226 and LED 228. However, the weight of one or more sheets of film on base 244 will close switch 220. When switch 220 is closed, the magnetic field impinged upon core 222 will cause an AC current flow through coil 226. The AC current flow from coil 226 is conditioned by circuitry 218 to provide a supply potential appropriate for driving LED 228. Circuitry 218 can also include a diode or other circuit elements (not shown) to protect LED 228 from damaging reverse bias voltages. LED 228 is thereby on-off modulated by the sensed presence of film within magazine 202. The on-off modulated light beam emitted by LED 228 is detected by photodiode 242 to provide a modulated output signal representative of film presence to the laser imager controller.

Sensors 40A' and 200 offer a number of important advantages. Since no physical interconnection is required between the two portions of the sensors, they can be used in applications in which it is advantageous or necessary to separate the transducer from the controller which uses the sensed information. The sensor is well adapted for use in harsh environments. It is also accurate and reliable.

Although the present invention has been described with reference of preferred embodiments, those skilled in the art will recognize that changes may be made to form a detail without departing from the spirit and scope of the invention.

What is claimed is:

1. A two-part sensor configured for disassembly and use in a corrosive environment, for generating a modulated output signal as a function of a sensed physical parameter, including:

a power source/signal receiver, comprising:

a solenoid coil configured for interconnection to a power supply, for producing a fluctuating magnetic field; and radiation sensitive detector configured to receive a modulated radiation beam, for producing the modulated output signal as a function of the beam;

a signal generator configured to be positioned adjacent to and physically disconnected from the power source/signal receiver, comprising:

sensing mean for sensing the physical parameter;

a relay coil for providing a supply potential derived from the fluctuating magnetic field;

a transducer circuit connected to the sensing means and to the relay coil and powered by the supply potential, for generating a modulated transducer signal as a function of the sensed physical parameter; and a radiation source connected to the transducer circuit and powered by the supply potential, for generating the modulated radiation beam as a function of the modulated transducer signal;

first encapsulant resistive to the corrosive environment in which the sensor is configured for use, for encasing the power source/signal receiver, at least the portion of the first encapsulant adjacent the detector being capable of propagating the modulated radiation beam; and second encapsulant resistive to the corrosive environment in which the sensor is configured for use, for encasing the signal generator, at least the portion of the encapsulant adjacent the radiation source being capable of propagating the modulated radiation beam; and the two-part sensor being configured such that:

the radiation sensitive detector being positioned directly adjacent the first encapsulant and configured to be positioned within the fluctuating magnetic field produced by the solenoid coil of the power source/signal receiver; and the radiation source being positioned directly adjacent the second encapsulant; and the first encapsulant and the second encapsulant being capable of transmitting the fluctuating magnetic field.

2. The sensor of claim 1 wherein:

the transducer circuit of the signal generator includes circuitry for generating a frequency modulated transducer signal as a function of the sensed parameter; and the radiation source generates a frequency modulated radiation beam as a function of the transducer signal.

3. The sensor of claim 1 wherein the transducer circuit of the signal generator further includes a capacitance-to-frequency converter coupled between the sensing means and the radiation source for converting capacitive information from the sensing means to frequency information.

4. The sensor of claim 1 wherein:

the transducer circuit includes a switch for generating an on-off modulated transducer signal as a function of the sensed parameter; and the radiation source generates an on-off modulated radiation beam.

5. The sensor of claim 1 wherein the signal generator further includes supply potential conditioning circuitry connected between the relay coil and the transducer circuit.

6. The sensor of claim 5 wherein the conditioning circuitry includes a rectifier and a filter.

7. The sensor of claim 1 wherein: the solenoid coil includes:

a solenoid core; and a solenoid wire coil around the core; and the relay coil includes:

a relay core; and a relay wire coil around the core.

8. The sensor of claim 7 wherein the solenoid core and the relay core include magnetically soft cores.

9. The sensor of claim 7 wherein:

the solenoid core includes an annular core with an aperture;

the radiation detector is mounted within the aperture of the solenoid core;

the relay core includes an annular core with an aperture; and the radiation source is mounted within the aperture of the relay core.

10. The sensor of claim 9 wherein:

the radiation detector includes a photodiode; and the radiation source includes an LED.

11. The sensor of claim 9 and further including a seal around the apertures between the relay core and solenoid core protecting the modulated radiation beam from interference from the corrosive environment.

12. A two-part sensor configured for disassembly and use in a corrosive environment, for generating a modulated output signal as a function of a sensed physical parameter, including:

a power source/signal receiver, comprising:

an annular solenoid core with an aperture;

a solenoid coil around the core, for producing a fluctuating magnetic field when connected to a power supply; and a radiation detector mounted within the aperture of the solenoid core and configured to receive a modulated radiation beam, for producing the modulated output signal as a function of the beam;

a signal generator configured to be positioned adjacent to and physically disconnected from the power source/signal receiver, comprising:

sensing means for sensing the physical parameter;

an annular relay core with an aperture configured to be positioned within the fluctuating magnetic field produced by the power source/signal receiver;

a relay coil around the core, for providing a signal generator supply potential derived from the fluctuating magnetic field;

a transducer circuit connected to the sensing means and to the relay coil and powered by the signal generator supply potential, for generating a modulated transducer signal as a function of the sensed physical parameter; and a radiation source connected to the transducer circuit and powered by the signal generator supply potential, for generating the modulated radiation beam as a function of the modulated transducer signal;

first encapsulant resistive to the corrosive environment in which the sensor is configured for use, for encasing the power source/signal receiver, at least the portion of the first encapsulant adjacent the detector being capable of propagating the modulated radiation beam; and second encapsulant resistive to the corrosive environment in which the sensor is configured for use, for encasing the signal generator, at least the portion of the second encapsulant adjacent the radiation source being capable of propagating the modulated radiation beam and the two-part sensor being configured such that:
the radiation Sensitive detector being positioned directly adjacent the first encapsulant and configured to be positioned within the fluctuating magnetic field produced by the solenoid coil of the power source/signal receiver; and the radiation source being positioned directly adjacent the second encapsulant; and the first encapsulant and the second encapsulant being capable of transmitting the fluctuating magnetic field.

13. The sensor of claim 12 wherein:
the transducer circuit of the signal generator includes circuitry for generating a frequency modulated transducer signal as a function of the sensed parameter; and the radiation source generates a frequency modulated radiation beam as a function of the transducer signal.

14. The sensor of claim 13 wherein the transducer circuit further includes a capacitance-to-frequency converter coupled between the sensing means and the radiation source for converting capacitive information from the sensing means to frequency information.

15. The sensor of claim 12 wherein:
the transducer circuit includes a switch for generating an on-off modulated transducer signal as a function of the sensed parameter; and the radiation source generates an on-off modulated radiation beam as a function of the transducer signal.

16. The sensor of claim 13 and further including supply potential conditioning circuitry connected between the relay coil and the transducer circuit.

17. The sensor of claim 16 wherein the conditioning circuitry includes a rectifier and a filter.

18. The sensor of claim 16 wherein the conditioning circuitry includes power supply protection circuitry.

19. The sensor of claim 12 wherein the solenoid core and relay core include magnetically soft cores.

20. The sensor of claim 12 wherein:
the radiation detector includes a photodiode; and
the radiation source includes an LED.

21. The sensor of claim 13 and further including a seal around the apertures between the relay core and the solenoid core protecting the modulated radiation beam from interference from the corrosive environment.

* * * * *

UNITED STATES PATENT AND TRADEMARK OFFICE
CERTIFICATE OF CORRECTION

PATENT NO. : 5,371,496
DATED : December 6, 1994
INVENTOR(S) : Tanamachi

It is certified that error appears in the above-indentified patent and that said Letters Patent is hereby corrected as shown below:

Column 2, line 9, delete "unite" and insert --units--.
Column 3, line 67, delete "statue" and insert --status--.
Column 4, line 22, delete "rode" and insert --rods--.
Column 5, line 27, delete "bathe" and insert --baths--.
Column 7, line 67, delete "Positioned" and insert --positioned--.
Column 11, line 11, delete "Sensitive" and insert --sensitive--.

Signed and Sealed this

Twenty-eight Day of March, 1995

Attest:

BRUCE LEHMAN

*Attesting Officer*  *Commissioner of Patents and Trademarks*